US012570123B2

(12) United States Patent
Menzel et al.

(10) Patent No.: US 12,570,123 B2
(45) Date of Patent: Mar. 10, 2026

(54) AIR NOZZLE FOR AN AIR OUTLET IN AN INTERIOR OF A MOTOR VEHICLE

(71) Applicant: Mercedes-Benz Group AG, Stuttgart (DE)

(72) Inventors: Christoph Menzel, Stuttgart (DE); Bernd Schroeter, Weil der Stadt (DE); Bernd Plocher, Rottenburg (DE); Klaus Kuonath, Calw (DE)

(73) Assignee: Mercedes-Benz Group AG, Stuttgart (DE)

( * ) Notice: Subject to any disclaimer, the term of this patent is extended or adjusted under 35 U.S.C. 154(b) by 371 days.

(21) Appl. No.: 18/251,355

(22) PCT Filed: Oct. 11, 2021

(86) PCT No.: PCT/EP2021/077998
    § 371 (c)(1),
    (2) Date: May 1, 2023

(87) PCT Pub. No.: WO2022/089922
    PCT Pub. Date: May 5, 2022

(65) Prior Publication Data
    US 2024/0001732 A1      Jan. 4, 2024

(30) Foreign Application Priority Data

Nov. 2, 2020    (DE) ..................... 10 2020 006 713.1

(51) Int. Cl.
    *B60H 1/00*      (2006.01)
    *B60H 1/34*      (2006.01)
(52) U.S. Cl.
    CPC ....... *B60H 1/0065* (2013.01); *B60H 1/00678* (2013.01); *B60H 2001/3478* (2013.01)

(58) Field of Classification Search
    CPC ......................... B60H 1/0065; B60H 1/00678; B60H 1/3421; B60H 1/3428; B60H 2001/3478
    (Continued)

(56) References Cited

U.S. PATENT DOCUMENTS 3,602,127  A     8/1971  Walker et al.
    2004/0038643  A1    2/2004  Katagiri et al.
    (Continued)

FOREIGN PATENT DOCUMENTS

CN       109130789  A     1/2019
    CN       110816223  A     2/2020
    (Continued)

OTHER PUBLICATIONS

PCT/EP2021/077998, International Search Report dated Jan. 5, 2022 (Two (2) pages).
    (Continued)

*Primary Examiner* — Vivek K Shirsat
(74) *Attorney, Agent, or Firm* — Crowell & Moring LLP

(57)            ABSTRACT
An air nozzle of an air outlet in an interior of a motor vehicle. An operating element is adjustable around an axis of rotation. A kinematics adjustment system has a deflection unit where, via an adjustment of the operating element, a shut-off flap inside the air outlet is displaceable around a flap axis by the kinematics adjustment system. The operating element is disposed on an end of an actuator rod where the actuator rod is displaceable in a direction of extension from an actuating position into a locking position. The axis of rotation of the operating element runs transversely to the flap axis, a rotational movement of the actuator rod is deflectable by the deflection unit into a rotational movement of the shut-off flap, and, by displacing the actuator rod into the locking position, the deflection unit is lockable by applying a spring force to the deflection unit.

6 Claims, 7 Drawing Sheets

(58) Field of Classification Search
USPC .......................... 454/143, 314, 316, 319, 320
See application file for complete search history.

(56) References Cited

U.S. PATENT DOCUMENTS

| | | | |
|---|---|---|---|
| 2019/0001790 | A1 | 1/2019 | Demerath et al. |
| 2020/0047593 | A1 | 2/2020 | Lee et al. |
| 2021/0039477 | A1 | 2/2021 | Demerath |
| 2021/0094392 | A1* | 4/2021 | Munoz ................. B60H 1/3421 |

FOREIGN PATENT DOCUMENTS

| | | | |
|---|---|---|---|
| DE | 2 012 000 | A1 | 2/1971 |
| DE | 102 26 441 | B3 | 3/2004 |
| DE | 10 2009 003 816 | B3 | 6/2010 |
| DE | 20 2010 013 073 | U1 | 4/2011 |
| DE | 10 2010 055 134 | A1 | 6/2012 |
| DE | 10 2012 017 189 | A1 | 3/2014 |
| DE | 10 2016 115 365 | A1 | 3/2017 |
| DE | 10 2017 125 321 | A1 | 5/2019 |
| DE | 10 2018 105 714 | A1 | 9/2019 |
| EP | 0 057 081 | A2 | 8/1982 |
| JP | 1-204817 | A | 8/1989 |
| JP | H01204817 | A * | 8/1989 |
| WO | WO 2019/084222 | A1 | 5/2019 |

OTHER PUBLICATIONS

German-language German Office Action issued in German application No. 10 2020 006 713.1 dated Apr. 20, 2021 (Five (5) pages).
Chinese-language Office Action issued in Chinese Application No. 202180073260.X dated Jun. 27, 2025 (8 pages).

* cited by examiner

AIR NOZZLE FOR AN AIR OUTLET IN AN INTERIOR OF A MOTOR VEHICLE

BACKGROUND AND SUMMARY OF THE INVENTION

The invention relates to an air nozzle for an air outlet in an interior of a motor vehicle.

In order to regulate an air volume of the ventilation system, air nozzles arranged on the end of an air outlet in the interior of a motor vehicle have at least one shut-off flap. By pivoting the at least one shut-off flap, an air discharge opening can additionally usually be closed, and can also direct a discharged airflow in a desired direction. For adjusting the at least one shut-off flap, mechanical, electrical or electromechanical systems are usually used according to the prior art. In particular for reasons of reliability and due to lower costs, mechanical systems are preferably used compared to electrical or electromechanical systems. Mechanical systems for adjusting the at least one shut-off flap are divided into pressure adjusters and rotary adjusters.

An air vent for a vehicle is to be taken as known from DE 10 2018 105 714 A1. The air vent comprises an air duct, defined by a housing, with an air inlet end and and an air outlet end. The airflow flowing through the air duct can flow from the air inlet end to the air outlet end along a main direction of flow. The air vent also comprises an operating element for controlling the air discharge direction of the airflow, wherein the air discharge direction undergoes a change along an axis of movement during a translational movement of the operating element along this axis of movement. Furthermore, the air discharge direction undergoes a change perpendicular to the axis of movement during a tilting movement of the operating element. The operating element is arranged outside the airflow. A disadvantage in the previously mentioned prior art is that the operating element protrudes from the component surroundings and therefore does not visually blend into a remaining inside interior of the motor vehicle. Additionally, the operating element needs to be of a considerable size for ensuring good ergonomics, which is not unproblematic due to the available installation space and due to the visual appearance. Finally, an ergonomic operation of the operating element is generally only possible to a limited extent.

A wind direction regulator that enables an operation of an air damper with a stable operating load and offers an excellent operating feel is disclosed in DE 10 2016 115 365 A1. The wind direction regulator comprises a cylindrically shaped housing body, as well as an axial support body, which is rotatably axially supported on the housing body, so that it has an axis along a direction that is transverse to an axial direction of the housing body. The wind direction regulator furthermore comprises an air damper that is rotatably axially supported on the axial support body, so that it has an axis along a direction that is transverse to the axis. Finally, a load adjustment unit of the wind direction regulator, which adjusts a rotary load of the air damper, comprises a rotary unit which is provided in one of the housing body and the air damper, as well as a receiving unit which is provided in the other of the housing body and the air damper. This is configured such that it slidably receives the rotary unit, and a pressure unit of the load adjustment unit is configured such that it presses one of the rotary unit and the receiving unit against the other.

Furthermore, an air vent for a vehicle is disclosed in DE 10 2017 125 321 A1, which comprises an air duct defined by a housing. The air vent additionally comprises an actuating element and at least one airflow regulator element adjustable by means of the actuating element, wherein an airflow flowing along a main direction of flow through the air duct can be influenced by adjusting the at least one airflow regulator element. A damping element acting on the actuating element is thereby pre-tensioned in a contact position on the actuating element.

Finally, an air nozzle, in particular suited for application in the individual ventilation system of an aeroplane is disclosed by DE 10 2012 017 189 A1. This comprises a housing in which an air duct is formed, which comprises an air inlet opening, as well as an air discharge opening. A sealing element can be adjusted between a first operating position, in which it prevents an airflow through the air duct, and a further operating position, in which it allows an airflow through the air duct. An actuating element is received moveably into the housing in the direction of a longitudinal axis of the housing and is coupled with the sealing element in such a way that the sealing element can be adjusted between its first operating position and its second operating position by means of a displacement of the actuating element in the housing in the direction of the longitudinal axis of the housing.

It is the object of the present invention to develop an air nozzle of the kind mentioned at the start in such a way that the air nozzle can be especially advantageously embedded in the component surroundings and can be simply and ergonomically operated.

The air nozzle according to the invention for an air outlet in the interior of a motor vehicle comprises an operating element that can be adjusted around an axis of rotation, by means of which adjustment at least one shut-off flap inside the air outlet can be displaced around a flap axis by means of a kinematics adjustment system. The flap axis thereby runs transversely to an airflow inside the air outlet. The operating element is arranged on the end of an actuator rod which can be displaced in its direction of extension from an actuating position into a locking position.

In order to develop an air nozzle of the kind herein in such a way that the air nozzle can be especially advantageously embedded in a component surroundings and can be operated better, it is provided according to the invention that the axis of rotation of the operating element runs transversely to the flap axis of the shut-off flap. A rotational movement of the actuator rod can be deflected in a rotational movement of the shut-off flap by means of a deflection unit of the kinematics adjustment system. By displacing the actuator rod into the locking position, the deflection unit can be locked by applying a spring force to it.

The arrangement of the actuator rod or of its axis of rotation transverse to the flap axis, so therefore, for example, parallel to the airflow, thereby enables an especially ergonomic actuation of the operating element, since this can, for example, be grasped completely on the external periphery. Additionally, the operating element can be embedded especially conveniently into the component surroundings on the end of the actuator rod.

The operating element can, for example, be a twist cap, and is manually operable by a user. By grasping and rotating the operating element, the user can transfer a force to the operating element. The operating element is connected with the kinematics adjustment system in such a way that, by means of rotating the operating element at least indirectly, the at least one shut-off flap can be adjusted. To this end, the operating element is connected with the actuator rod or is formed as part of this, wherein the operating element and the actuator rod can be adjusted or rotated around the axis of rotation. The actuator rod is connected with the deflection unit of the kinematics adjustment system, which is connected with the at least one shut-off flap. The shut-off flap is arranged in such a way that the flap axis is transverse, in particular perpendicular to the axis of rotation of the actuator rod.

On an end of the actuator rod that is opposite to the operating element, a pressure spring is arranged, for example in such a way that the pressure spring is pushed onto the actuator rod. The actuator rod has a projection, against which the pressure spring rests. The projection is arranged between the pressure spring and the operating element in the longitudinal dimension of the actuation axis. The pressure spring also rests against the deflection unit. By means of pressing the operating element in the axial direction of the axis of rotation, the pressure spring is pressed in the direction of the deflection unit by means of the projection. In other words, the pressure spring is compressed, whereby the spring force acts on the deflection unit. The deflection unit is therefore locked. Advantageously, an especially constant interior climate can be provided by means of the locking of the shut-off flap.

In a further advantageous embodiment, the operating element is at least substantially flush with an operating surface of the air nozzle in the locking position. The operating surface of the air nozzle is, for example, at least partially formed by means of a dashboard of the motor vehicle. In order to provide a visually especially appealing operating surface, it is advantageously provided to be able to press the operating element in the axial direction of the axis of rotation to such an extent that a surface of the operating element is flush with the operating surface. In other words, the operating element is not raised in the locking position compared to the surrounding operating surface.

In a further advantageous embodiment, the actuator rod is held in the locking position by means of a shift gate device. The actuator rod is received in the shift gate device in such a way that the actuator rod is connected at least frictionally with the shift gate device. In other words, the shift gate device moves with the actuator rod.

In a further advantageous embodiment, the shift gate device comprises a guide carriage, in which the actuator rod is received, and a shift gate, in which a shift pin protruding from the guide carriage is guided. The shift gate can, for example, be a switch crossing. The shift gate comprises at least two engagement positions, in which the shift pin can engage and is thus locked. By means of pressing the operating element in the axial direction of the axis of rotation, not only the actuator rod, but also the guide carriage consequently moves. The shift pin protruding from the guide carriage is moved in the axial direction by means of pressing the operating element until the shift pin engages in one of the at least two engagement positions and is locked. Preferably, at least one of the two engagement positions of the shift pin corresponds with the locking position of the operating element. In other words, it is preferably provided that the operating element is arranged in the locking position, in particular flush with the operating surface. The advantageous embodiment provides an especially compact construction method for the shift gate device.

In a further advantageous embodiment, the deflection unit has a deflection lever, which is arranged on an end of the actuator rod opposite to the operating element, and a coupling rod, by means of which the deflection lever is connected with a flap lever.

Further advantages, features and details of the invention arise from the description of a preferred exemplary embodiment below, as well as with the aid of the drawings. The features and feature combinations referred to in the description, as well as the features and feature combinations referred to below in the description of the figures and/or shown solely in the figures can be used not only in each specified combination but also in other combinations or alone without leaving the scope of the invention.

DETAILED DESCRIPTION OF THE DRAWINGS

Figure 1:
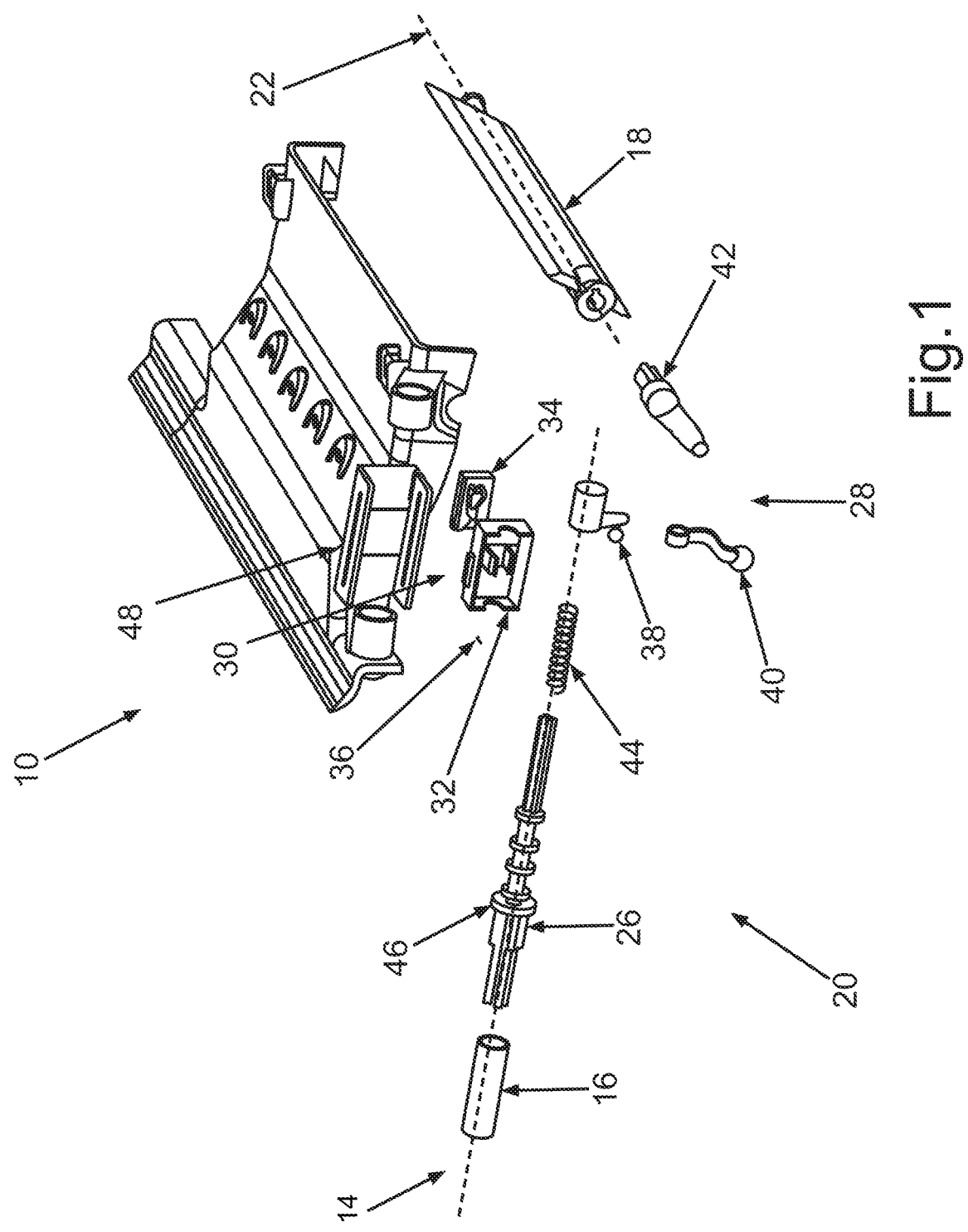
FIG. 1 is an exploded view of an air nozzle according to the invention.
Figure 2:
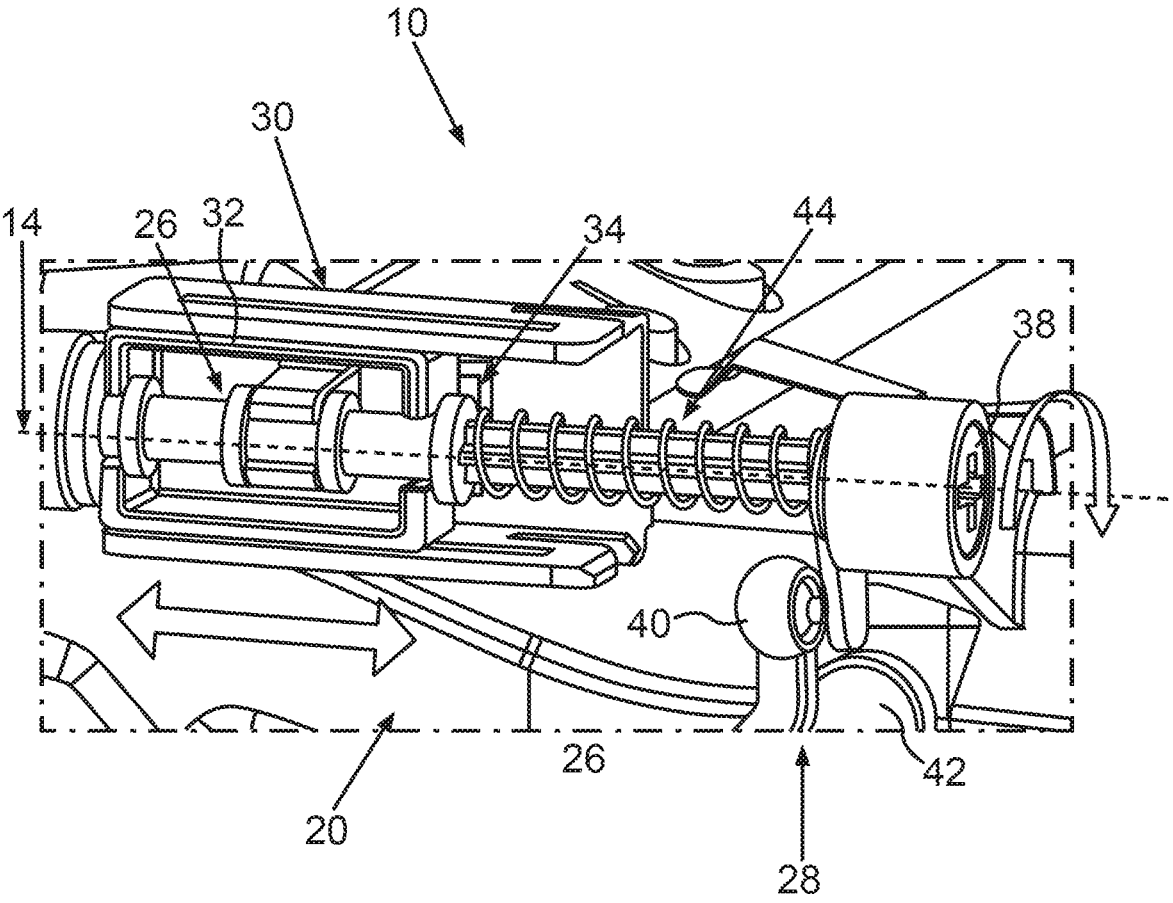
FIG. 2 is a schematic perspective view of the air nozzle.

An air nozzle 10 for an air outlet 12 of a ventilation device in an interior of a motor vehicle is shown in a perspective exploded view in FIG. 1. The air nozzle 10 comprises an operating element 16, that can, for example, be a rotary adjuster. The operating element 16 can be operated by a user, for example the driver of the motor vehicle. An operating of the operating element 16 is, for example, possible by means of a rotating around an axis of rotation 14 or a pressing in the direction of the axis of rotation 14.

Furthermore, the air nozzle 10 comprises an actuator rod 26, which is operatively connected with the operating element 16 and can be adjusted around the axis of rotation 14. In other words, the operation of the operating element 16, so, for example, the rotation or pressing, causes a rotation or pressing of the actuator rod 26. In still other words, the actuator rod 26 rotates or moves along the axis of rotation 14 exactly as far as the operating element 16 is rotated or pressed.

Additionally, the air nozzle 10 comprises a pressure spring 44, which is arranged along the axis of rotation 14. The pressure spring 44 is pushed onto the actuator rod 26 and can be supported or is supported by means of a projection 46 of the actuator rod 26. On another end of the pressure spring 46, which is opposite the projection 46, the pressure spring 46 can be supported or is arranged supported on a deflection lever 38.

Figure 3:
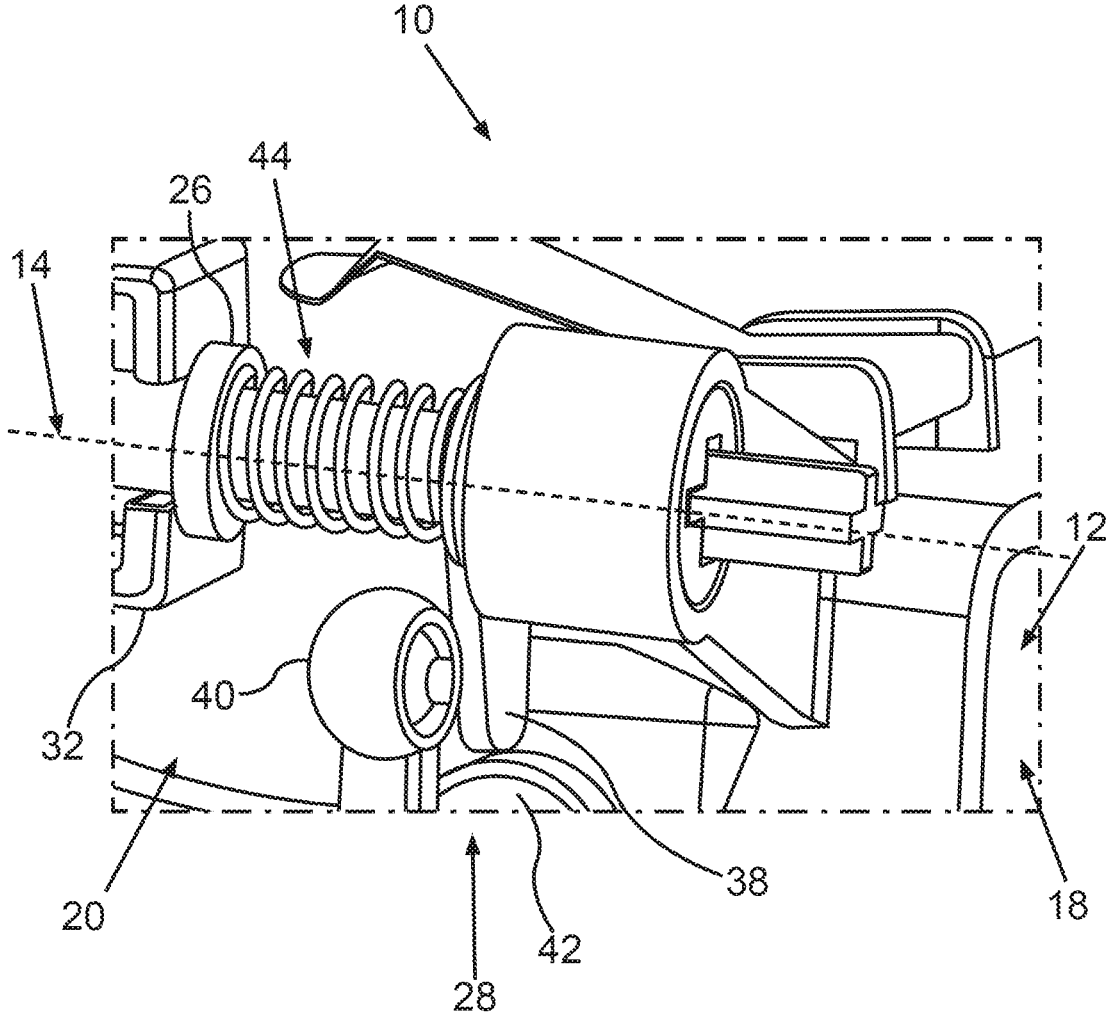
FIG. 3 is a schematic detail view of the air nozzle.

The air nozzle 10 has a deflection unit 28 of a kinematics adjustment system 20, by means of which a rotational movement of the operating element 16 around the axis of rotation 14 can be deflected in a rotational movement of a shut-off flap 18 around a flap axis 22. The deflection unit 28 comprises the deflection lever 38, a coupling rod 40 and a flap lever 42. The deflection lever 38 is operatively connected with the actuator rod 26. The deflection lever 38 can, for example, be penetrated by the actuator rod 26, as shown in FIG. 3.

The air nozzle 10 also comprises the coupling rod 40 that is operatively connected with the deflection lever 38. The deflection lever 38 can, for example, have a ball head by means of which the coupling rod 40 and the deflection lever 38 can be connected or are connected.

Furthermore, the air nozzle 10 comprises the flap lever 42, which is connected with the shut-off flap 18. The flap lever 42 is also connected with the coupling rod 40. For example, the flap lever can be fixed in extension of the flap axis 22.

The air nozzle 10 also comprises a shift gate device 30. The shift gate device 30 comprises a guide carriage 32, by means of which the actuator rod 26 is received. The guide carriage 32 can, for example, be received in a guide 48, as shown by FIG. 1. In other words, the actuator rod 26 is received in the guide carriage 32 in such a way that the actuator rod 26 can be moved together with the guide carriage 32 in the guide 32 in a direction 50. The shift gate device 30 also comprises a shift gate 34, which can, for example, be a switch crossing. The shift gate 34 has at least two engaged positions, in which a shift pin 36 can be received and can thereby be locked. The shift pin 36 is fixed on the shift gate 34 in such a way that the shift pin 36 can engage in the at least two engaged positions of the shift gate 34.

The at least two engaged positions preferably characterize a locking position or an actuating position of the operating element 16. In the actuating position, the operating element 16 is operable for the user, in particular both by means of rotation as well as by means of pressing. In other words, the operating element 16 is not pressed into the actuating position and thus protrudes from the component surroundings. The component surroundings can, for example, be a dashboard of a cockpit.

In the locking position, the operating element 16 is not operable for the user, at least by means of rotation, since the operating element 16 is pressed into the locking position, preferably in such a way that the operating element 16 is flush with the component surroundings. In other words, the operating element 16 does not protrude from the component surroundings into the locking position and can therefore not be operated by the user, at least by means of rotation.

A change between locking position and actuating position is possible by means of pressing the operating element 16. By means of pressing the operating element 16, this and the actuator rod 26 are displaced along the axis of rotation 14. The pressure spring 44 is thereby gripped by means of the projection 46 of the actuator rod and is pressed against the deflection lever 38. In other words, the pressure spring 44 is compressed. In still other words, the pressure spring 44 exerts a spring force on the deflection lever 38, whereby this is locked. By means of pressing the operating element 16, the actuator rod 26 is also moved together with the guide carriage 32 from the operating position into the locking position in the direction 50 just far enough that the shift pin 36 comes into engagement with the shift gate 34, and indeed in particular with the engagement position that characterizes the locking position.

Figure 4:
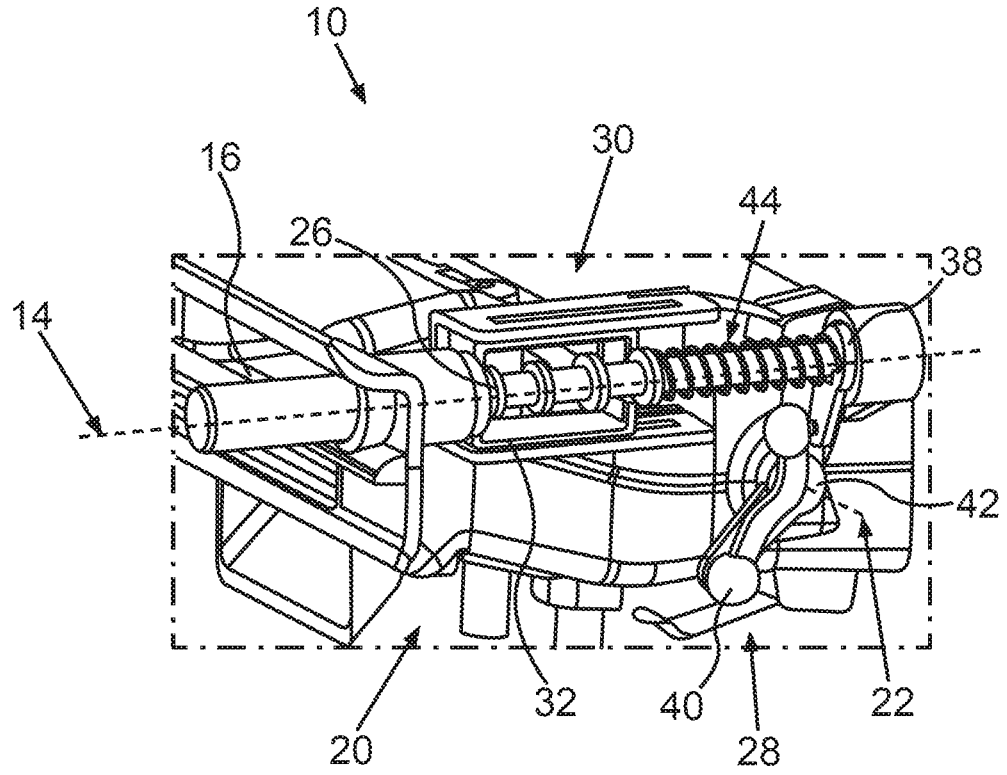
FIG. 4 is a schematic representation of the air nozzle with a shut-off flap in a closed position from a first perspective.
Figure 5:
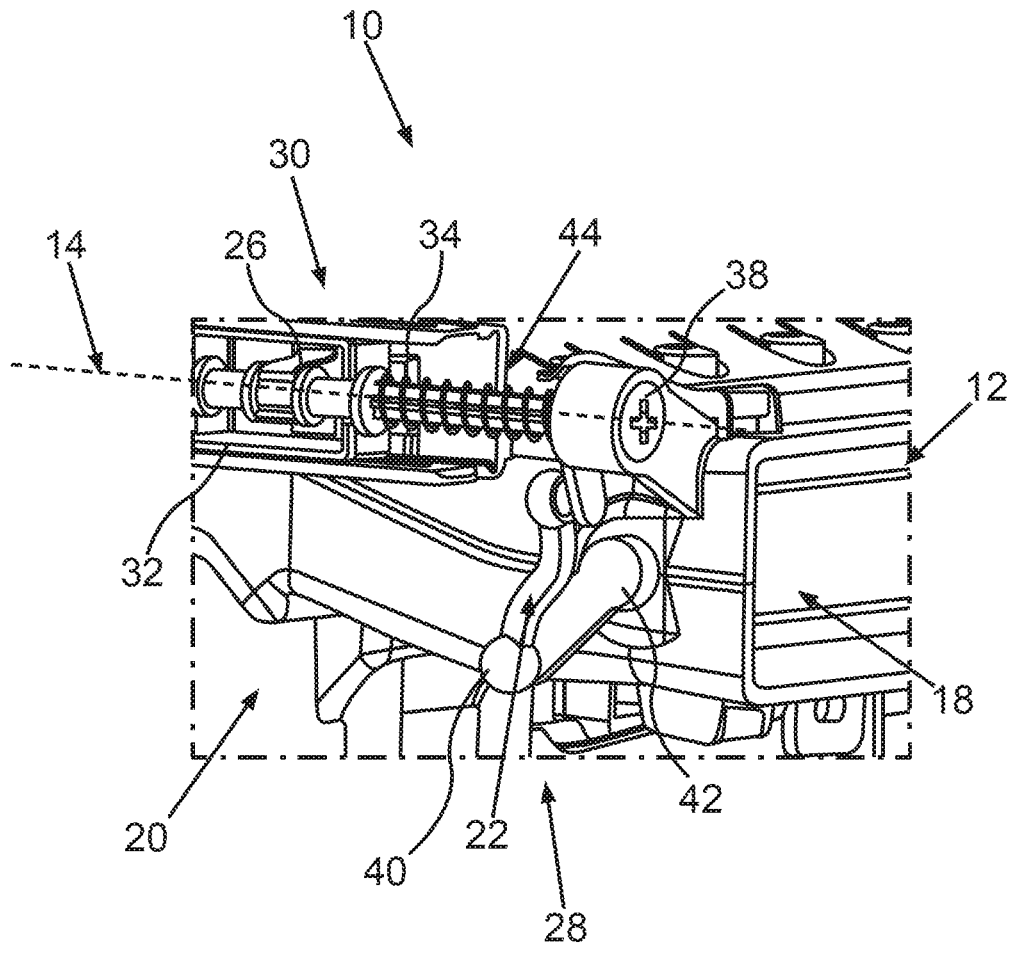
FIG. 5 is a schematic representation of the air nozzle with a shut-off flap in a closed position from a second perspective.
Figure 6:
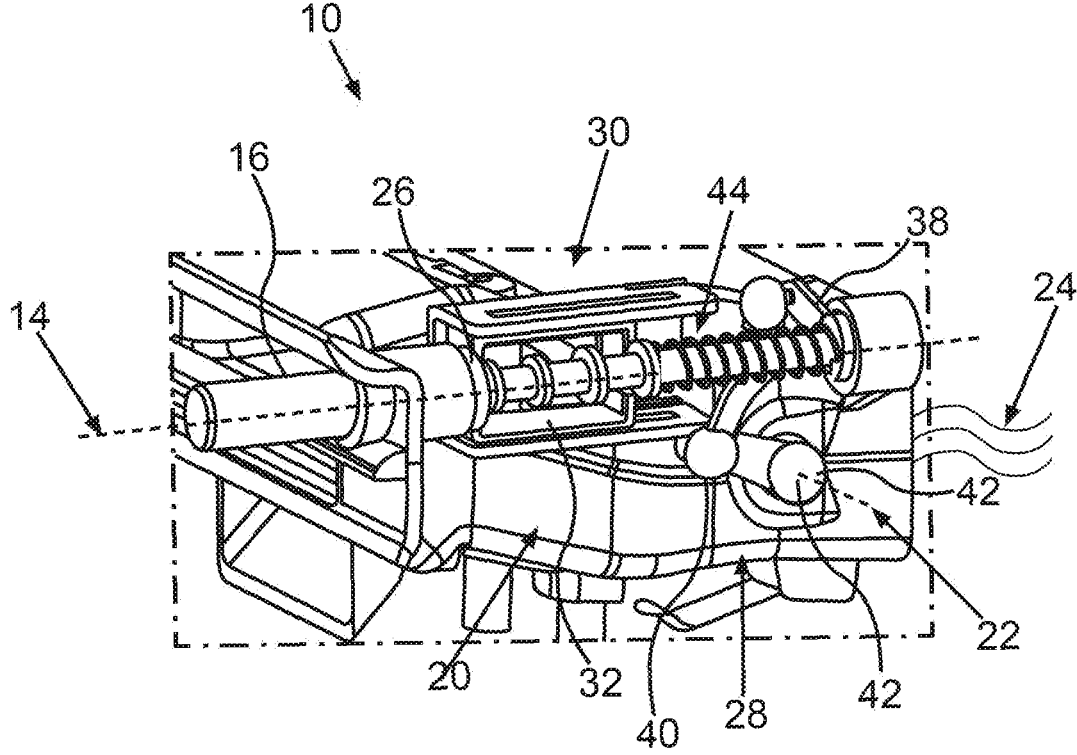
FIG. 6 is a schematic representation of the air nozzle with a shut-off flap in a closed position from a first perspective.
Figure 7:
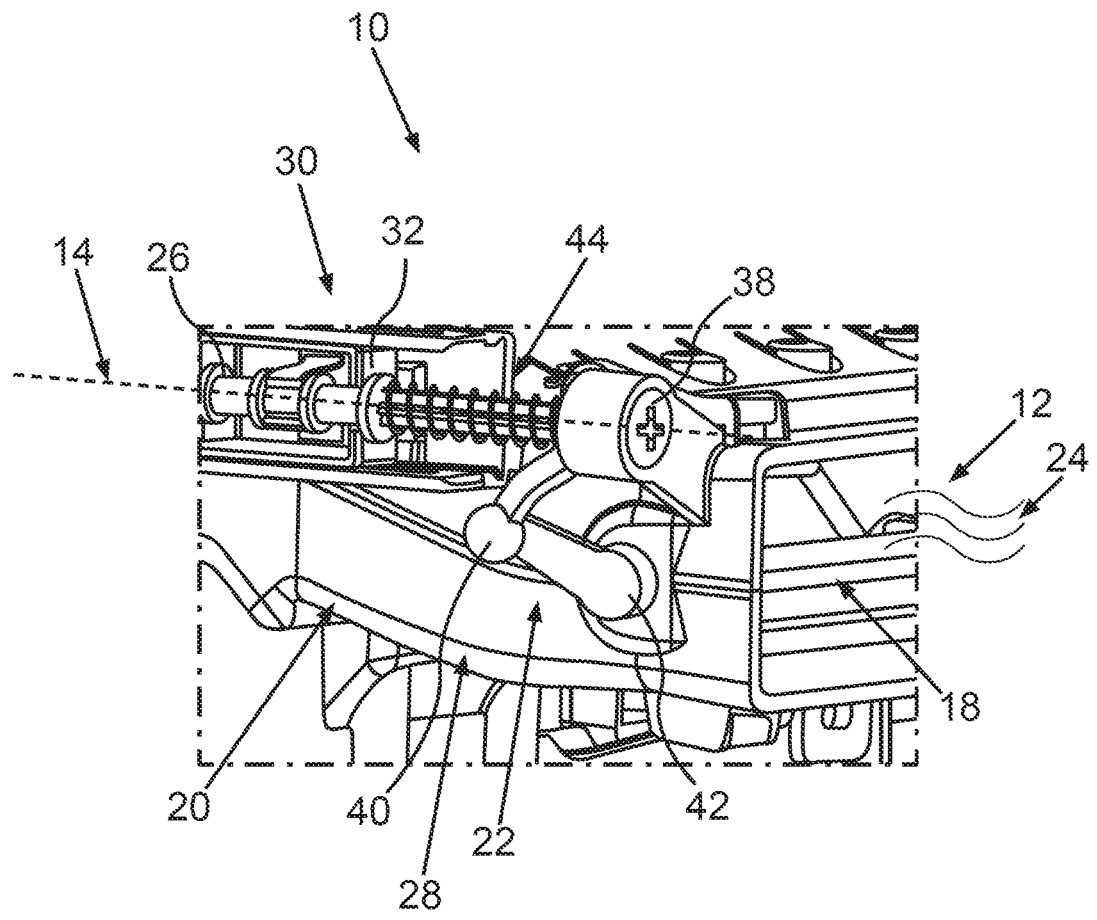
FIG. 7 is a schematic representation of the air nozzle with a shut-off flap in a closed position from a second perspective.

The shut-off flap 18 can in particular be adjusted between a closed position, as shown in FIG. 4 and FIG. 5, and an open position, as shown in FIG. 6 and FIG. 7. To this end, the shut-off flap 18 is pivoted around the flap axis 22. The flap axis 18 is preferably transverse, in particular perpendicular, to the axis of rotation 14. By means of the rotation of the operating element 16 around the axis of rotation 14, the rotation of the shut-off flap 18 must consequently occur around the flap axis. This is accomplished by means of the kinematics adjustment system 20.

In the open position, the shut-off flap 18 stands in the air outlet 12 in such a way that the shut-off flap 18 can be flowed around by an airflow 24, as, for example, is shown in FIG. 6 and FIG. 7.

In the closed position, the shut-off flap 18 stands in the air outlet 12 in such a way that the shut-off flap 18 cannot be flowed around by an airflow 24, as, for example, is shown in FIG. 4 and FIG. 5. In the closed position, the shut-off flap 18 stands, in its planar dimension, in particular at a substantially perpendicular angle to the air outlet 12.

The invention claimed is:

1. An air nozzle (10) of an air outlet (12) in an interior of a motor vehicle, comprising:
   an operating element (16) that is adjustable around an axis of rotation (14);
   a kinematics adjustment system (20), wherein the kinematics adjustment system (20) has a deflection unit (28) and wherein via an adjustment of the operating element (16) a shut-off flap (18) inside the air outlet (12) is displaceable around a flap axis (22) by the kinematics adjustment system (20); and
   an actuator rod (26), wherein the operating element (16) is disposed on an end of the actuator rod (26) and wherein the actuator rod (26) is displaceable in a direction of extension of the actuator rod (26) from an actuating position into a locking position;
   wherein the axis of rotation (14) of the operating element (16) runs transversely to the flap axis (22), wherein a rotational movement of the actuator rod (26) is deflectable by the deflection unit (28) of the kinematics adjustment system (20) into a rotational movement of the shut-off flap (18), and wherein, by displacing the actuator rod (26) into the locking position, the deflection unit (28) is lockable by applying a spring force to the deflection unit (28);
   wherein the actuator rod (26) is held in the locking position by a shift gate device (30).

2. The air nozzle (10) according to claim 1, wherein the operating element (16) is flush with an operating surface of the air nozzle (10) in the locking position.

3. The air nozzle (10) according to claim 1, wherein the shift gate device (30) comprises a guide carriage (32), in which the actuator rod (26) is received, and a shift gate (34), in which a shift pin (36) protruding from the guide carriage (32) is guided.

4. The air nozzle (10) according to claim 1, wherein the actuator rod (26) is perpendicular to the flap axis (22) in direction of extension.

5. The air nozzle (10) according to claim 1, wherein the axis of rotation (14) is parallel to an airflow (24) inside the air outlet (12).

6. The air nozzle (10) according to claim 1, wherein the deflection unit (28) has a deflection lever (38), which is disposed on an end of the actuator rod (26) opposite to the operating element (16), and a coupling rod (40), via which the deflection lever (38) is connected with a flap lever (42).

* * * * *